United States Patent Office 3,413,247
Patented Nov. 26, 1968

3,413,247
ISOLATION OF A CHLOROPRENE POLYMER FROM A LATEX
Stanley Brian Schroeder, Muskegon, Mich., assignor to E. I. du Pont de Nemours and Company, Wilmington, Del., a corporation of Delaware
No Drawing. Filed Mar. 14, 1966, Ser. No. 533,800
3 Claims. (Cl. 260—17)

This invention relates to an improvement in the drum drying of a chloroprene polymer latex.

Solid chloroprene polymer can be isolated from the latex form in which it is polymerized by evaporating the water from the latex on the drum dryer. It is highly desirable to dry the polymer to a moisture content of about 1% of residual water or less. The drying rate is very important and when it is undesirably slow it causes a loss in productivity in the drum drying equipment.

It has been found in accordance with this invention that the drum drying rate of a chloroprene polymer latex can be improved by incorporating into the latex prior to drying relatively small amounts of a hydroxyethyl cellulose having an average of about 3 moles of ethylene oxide combined with each anhydroglucose unit in the cellulose. It is preferred to employ from about 0.025 to 0.05 weight percent of the hydroxyethyl cellulose based on the weight of chloroprene polymer in the latex. If less than about 0.01% is used, the improvement in drying rate is negligible. If more than about 0.25% is used the additional improvement in drying rate is usually not great enough to justify the increased cost.

The hydroxyethyl cellulose is added to the latex as an aqueous solution. It may be added at any concentration where the viscosity of the solution is in a desired range. It has been found that a concentration of 1 to 1.5% is suitable for use in the isolation of chloroprene polymer from the latex.

The chloroprene polymer is typically made in an aqueous emulsion system described for example in Keller, U.S. Patent 2,914,497 (British spec. No. 807,496). The process involves forming an emulsion of chloroprene, polymerizing at about 40% solids, short-stopping the polymerization, removing unpolymerized monomer, and drum-drying the latex to form a film of solid chloroprene polymer which may then be used for compounding into finished products by conventional techniques. Typically, when the film of solid chloroprene polymer is isolated by the drum dryer from the latex at a rate of 1300 to 2500 pounds per hour, it contains from 0.5 to 1% of residual moisture.

The invention will now be described with reference to the following examples of specific embodiments thereof herein parts and percentages are by weight unless otherwise specified.

EXAMPLE 1

A polychloroprene latex is prepared in accordance with the teachings of Example 1 of U.S. Patent 2,914,497. The solids content of the latex is about 42%. 20 ml. of a 1% solution of "Natrosol 300G"[1] hydroxyethyl cellulose is stirred into 1000 ml. of the latex, which contains 454 grams of polychloroprene. The hydroxyethyl cellulose content is 0.043% based on the polychloroprene. Several batches are made to provide enough latex mixture for further processing. The batches of mixture are transferred to a 12-in. chromium plated double drum dryer using a drum speed of 20 r.p.m. and a steam pressure about 100 p.s.i.g.

It is found that a polychloroprene film dried to a moisture content of less than 0.25% is produced at a rate of about 1077 grams in 5 min. For comparison, a repetition of the example using "Natrosol 250G" (wherein an average of only about 2.5 moles of ethylene oxide are combined with each anhydroglucose unit) instead of "Natrosol 300G" revealed a production rate of only about 929 grams in 5 min. A repetition completely omitting the hydroxyethyl cellulose revealed a production rate of only about 887 grams in 5 min.

EXAMPLE 2

A polychloroprene latex containing about 42% polychloroprene is prepared in accordance with the teachings of Example 1 of U.S. Patent 2,914,497. A 1% aqueous solution of "Natrosol 300G" hydroxyethyl cellulose is mixed with the latex to provide 0.0375% by weight of the hydroxyethyl cellulose based on the weight of polychloroprene. The latex mixture is fed at a rate of about 6300 lbs./hr. to a 5 ft. diameter drum dryer heated by steam at a pressure of 128 p.s.i.g., and operating at a speed of 25 r.p.m., which conditions produce a dried polychloroprene containing about 1% moisture at an average rate of 2522 lbs./hr.

The use of the particular hydroxyethyl cellulose of this invention defined above represents a substantial improvement over the known use of hydroxyethyl cellulose having about 2.5 or less moles of ethylene oxide combined with each anhydroglucose unit in the cellulose.

The term chloroprene polymer as used herein covers homopolymers of chloroprene(2-chlorobutadiene-1,3) as well as copolymers thereof with other copolymerizable monomers, e.g., 2,3-dichlorobutadiene-1,3.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In the process of drum-drying a chloroprene polymer from a latex thereof, the improvement in drying rate which comprises adding to said latex from about 0.01 to 0.25 weight percent, based on said chloroprene polymer, of a hydroxyethyl cellulose wherein about 3 moles of ethylene oxide are combined with each anhydroglucose unit in the cellulose.

2. A process as defined in claim 1 wherein said weight percent range of said hydroxyethyl cellulose is 0.025 to 0.05.

3. A process as defined in claim 1 wherein the hydroxyethyl cellulose is added as a 1 to 1.5 weight percent aqueous solution.

References Cited

UNITED STATES PATENTS

| 3,004,938 | 10/1961 | Chambers et al. | 260—17 |
| 3,160,620 | 12/1964 | Petersen | 260—92.3 |
| 3,207,828 | 9/1965 | Petersen et al. | 264—175 |

WILLIAM H. SHORT, Primary Examiner.

E. NIELSEN, Assistant Examiner.

---

[1] A hydroxyethyl cellulose (commercially available from Hercules Powder Co.) having an average of 3 moles of ethylene oxide combined with each anhydroglucose unit in the cellulose. It has a Brookfield viscosity of 150 to 400 centipoises at 25° C. measured on a 2 percent aqueous solution using a No. 2 spindle at 60 r.p.m.